May 16, 1933.  R. A. HOLLAND  1,909,679
ARC WELDING ELECTRODE
Filed Jan. 9, 1931

INVENTOR
R. A. HOLLAND

Patented May 16, 1933

1,909,679

UNITED STATES PATENT OFFICE

ROY ALGERNON HOLLAND, OF ELSTERNWICK, VICTORIA, AUSTRALIA, ASSIGNOR TO E. M. F. ELECTRIC COMPANY PROPRIETARY LIMITED, OF NORTH CARLTON, VICTORIA, AUSTRALIA

ARC WELDING ELECTRODE

Application filed January 9, 1931. Serial No. 507,732.

This invention relates to improvements in covered electrodes used in electric arc welding, and it includes both an improved form of electrode and an improved means of manufacture.

Covered electrodes used in arc welding consist essentially of a metallic wire or core having a covering of a slag-producing material such as asbestos or blue asbestos impregnated with one or more fluxing substances. In the manufacture of these electrodes, the asbestos or other slag-producing material is ordinarily applied in the form of yarn or thread which is wound helically around the electrode core. Electrodes of this covered type are comparatively costly to manufacture as the asbestos or slag-producing material requires to be spun and otherwise formed into yarn or thread before it can be satisfactorily wound around the electrode core.

The present invention has been devised to provide an electrode in which the asbestos or other fibrous slag-producing material is applied to the electrode core in a loose or free state, that is to say without being spun into yarn or similarly prepared as is at present necessary. By the invention the cost of manufacturing electrodes is considerably reduced.

The invention consists essentially in coating the metallic core of the electrode with a suitable adhesive substance and applying the asbestos or other fibrous slag-producing material thereto in a loose or free state to cause it to adhere to the electrode core. The individual fibres of the asbestos are electrified by being given a charge of electricity, thus causing the individual fibres when applied to the adhesive coated core to repel each other whereby uniform spacing apart of the fibres is obtained. Electrification of the fibres may be effected by electrostatic induction, by frictional rubbing or agitation of the fibres or by other means. After the adhesion of the fibres to the core the fibres are electrically discharged and wrapped closely around the core, following which a flux covering may be applied.

In the accompanying diagrammatic drawing:—

According to one practical embodiment of the invention, the metallic core 1 of the electrode is first coated with a suitable adhesive substance such as silicate of soda indicated by 2, and the loose unprepared asbestos fibre 3 or other fibrous material use is applied thereto by mechanical means or by means of a suitable blast of air. The core is preferably in the form of wire and is coated with the adhesive by being fed continuously through a suitable trough.

Figure 1:
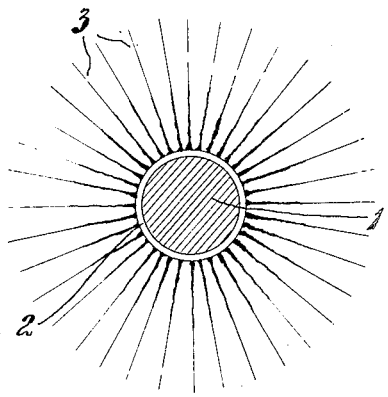
Figure 1 is a sectional view showing the electrified asbestos fibres adhering to the adhesive coated core of the electrode, and individually repelling one another.

The core 1 is electrified by being connected to a suitable source of electric energy preferably by means of contact rollers. The asbestos fibres adhere to the adhesive coated core and by the electrification of the core, said fibres are individually electrified by electrostatic induction from the core. This electrification of the fibres causes them to individually repel one another so that they diverge as far as possible from each other and extend outwardly in radial lines as shown in Figure 1. By this means, the fibres are uniformly spaced apart and prevented from adhering together.

Figure 2:
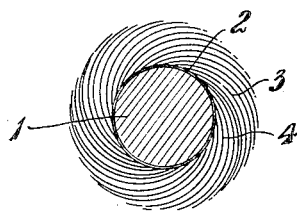
Figure 2 is a similar view showing the fibres in the act of being electrically discharged and wrapped around the core.
Figure 3:
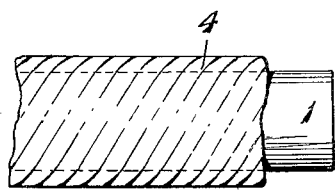
Figure 3 shows the fibres finally wrapped around the core.
Figure 4:
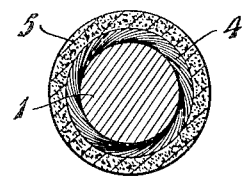
Figure 4 is a sectional view of the completed electrode with a flux covering applied.

The fibre covered electrode is now passed through suitable discharging means preferably consisting of revolving brushes. These brushes function to electrically discharge the fibres and also to cause them to be wrapped around the core in helical fashion as shown in Figures 2 and 3, forming a uniform layer 4 of asbestos fibre around the core.

The electrode core is now passed through a nozzle or other suitable device for applying an external coating 5 of fluxing substances.

In a modification of the invention the electrode core 1 need not be electrified, but the fibres only are electrified. This may be accomplished by providing electrified wires or the like in the chamber containing the fibrous material or in the conduit through which the fibrous material is delivered onto the electrode core. Alternatively, the fibres may be electrified by being mechanically agitated or frictionally rubbed together.

In some cases the external coating 5 of fluxing substances may be omitted, in which case the fibrous asbestos material may be appropriately treated to ensure effective adhesion to the core. In another embodiment of the invention two or more successive layers of asbestos fibre or similar fibrous material may be applied to the electrode core by successively coating the core with adhesive and applying the loose fibrous material thereto. By applying the fibrous material directly to the electrode core in loose or free state without preliminary preparation as herein described the cost of manufacture of covered welding electrodes is appreciably reduced. Furthermore, the fibrous material forms a substantially resilient layer between the flux coating 5 and the electrode core 1, thus enabling the electrode to be bent or subjected to rough usage without causing the flux covering to crack or become detached from the core. The internal layer of fibrous material also serves to space the flux coating from the electrode core, thus ensuring more satisfactory flowing of the metal of the core.

What I do claim is:—

1. The process of making an arc welding electrode consisting in coating a metallic core with an adhesive, applying fibrous material to the adhesive coating, inducing an electric charge in the fibrous particles to cause said particles to repel each other, and ensure even spacing of said particles, and coating the core and fibrous material with a flux.

2. The process of making an arc welding electrode consisting in coating a metallic core with an adhesive, applying fibrous material to the adhesive coating, inducing an electric charge in the fibrous particles to cause said particles to repel each other and ensure even spacing of said particles, discharging said induced charge and helically wrapping said fibrous material about the core, and coating said core and fibrous material with a flux.

3. The process of making an arc welding electrode as set forth in claim 2, wherein said electric charge is induced by passing an electric current along the core.

4. The process of making an arc welding electrode consisting in coating a metallic core with an adhesive, applying electrically charged fibrous material to said adhesive, the fibres repelling each other, thereby ensuring even spacing on said adhesive, discharging said charge and helically winding the fibres around the core, and coating said core and fibrous material with a flux.

In testimony whereof I affix my signature.

R. A. HOLLAND.